Aug. 12, 1958     E. J. SCHAEFER     2,847,629
INSTANTLY REVERSING MOTOR
Filed May 22, 1957     2 Sheets-Sheet 1
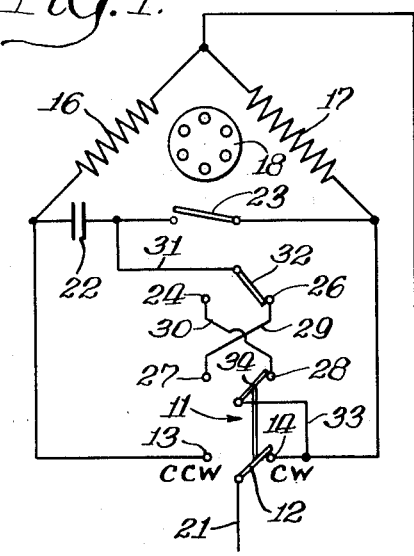
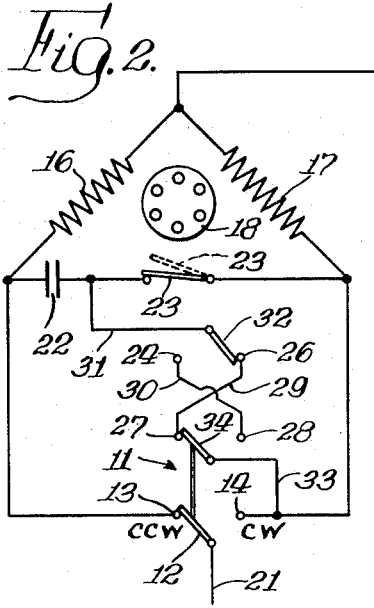
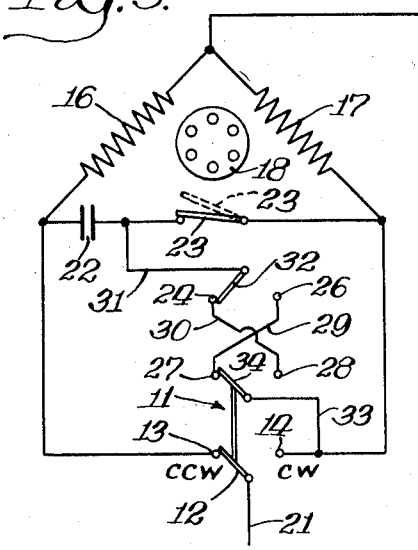
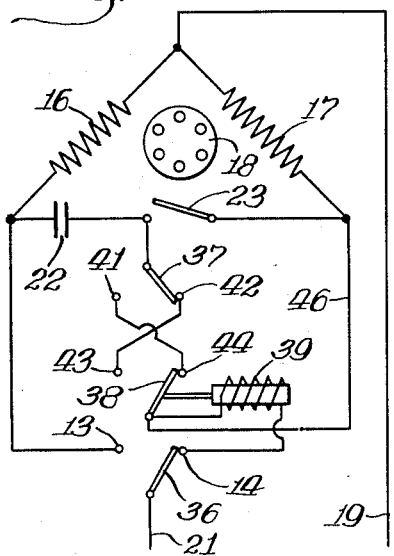
INVENTOR.
Edward J. Schaefer
BY
Davis, Lindsey, Hibben & Noyes
Att'ys.

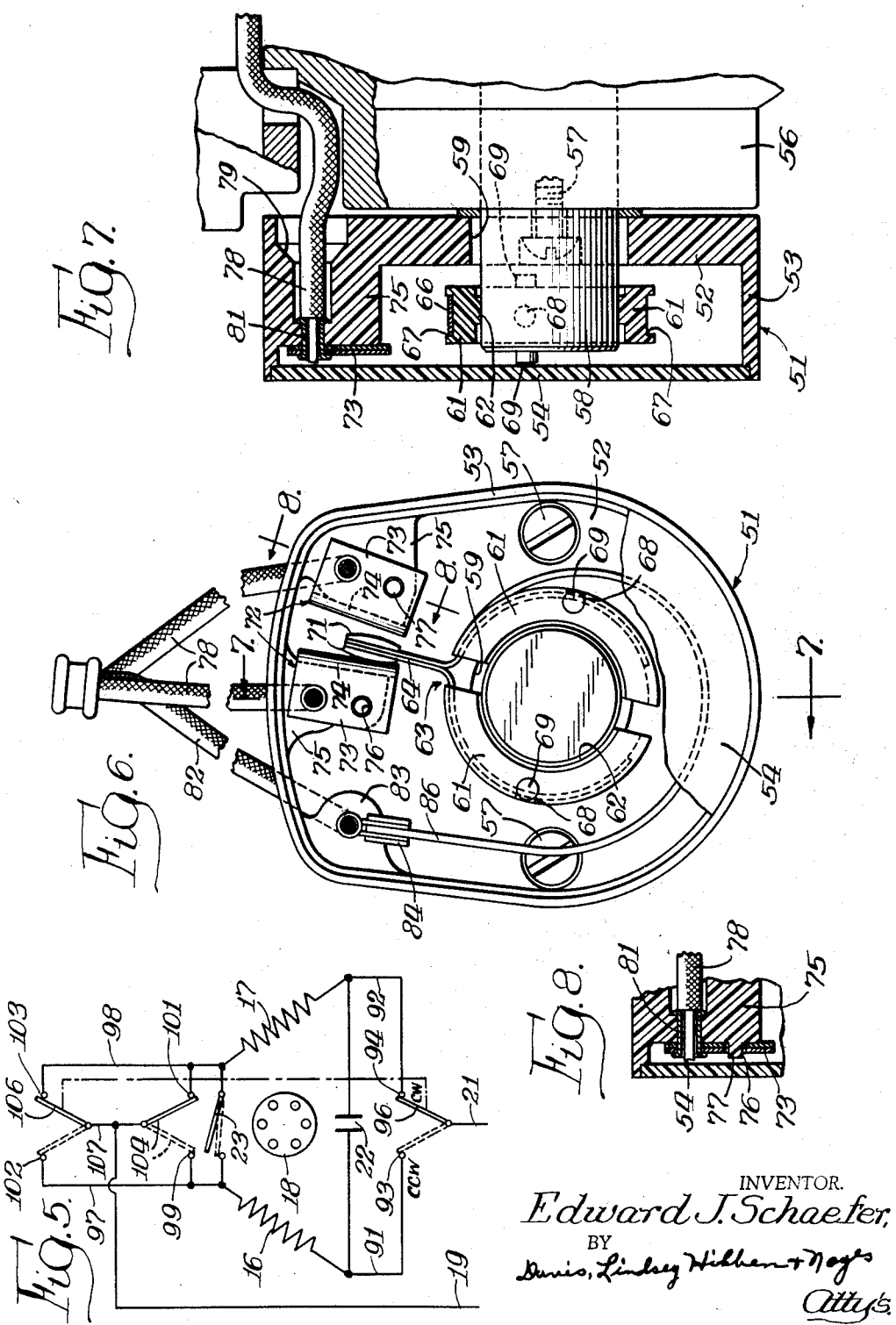

United States Patent Office 2,847,629
Patented Aug. 12, 1958

2,847,629
INSTANTLY REVERSING MOTOR

Edward J. Schaefer, Fort Wayne, Ind.

Application May 22, 1957, Serial No. 660,850

18 Claims. (Cl. 318—207)

This application is a continuation-in-part of my co-pending application Serial No. 493,130, filed March 9, 1955.

This invention relates to improvements in instantly reversing motors and more particularly motors of the single phase capacitor start type.

Split phase motors generally employ an automatic speed responsive or centrifugal switch for cutting out or modifying the starting winding circuit connections as the motor comes up to speed. In certain reversing arrangements in motors of this type it is necessary to wait for the motor to come to a full stop or until the automatic speed responsive switch functions to reconnect the starting winding before throwing the manual reversing switch. Obviously, this is a serious limitation for many applications of small single phase reversible motors. Various instantly reversing arrangements have been proposed to overcome this disadvantage, some of which employ purely mechanical means for varying the relationship of the windings while others utilize electrical actuating elements such as relays and the like. However, many of the instantly reversing motor schemes heretofore proposed are far too complex or are not sufficiently reliable in use so that in spite of the many suggestions which have been made along these lines there is still an outstanding need for a simple, inexpensive, and durable mechanism for instantly reversing a single phase motor. As will hereinafter appear, my invention has the important advantage of being readily adaptable to a standard single phase motor with a conventional type centrifugal or speed responsive switch.

Accordingly, a primary object of the invention is to provide a novel instantly reversing arrangement for single phase motors which is quite simple, inexpensive and durable.

A further object of the invention is to provide a novel instantly reversing motor circuit which can be readily adapted to a standard single phase split phase motor having a conventional centrifugal switch.

Other objects and advantages of the invention will become evident from the subsequent detailed description taken in conjunction with the accompanying drawings, wherein:

Fig. 1 is a schematic circuit diagram of one specific embodiment of the invention as applied to a single phase capacitor start motor and showing the conditions existing during operation of the motor in one direction;

Fig. 2 is a similar circuit diagram showing the conditions existing during reversal of the motor;

Fig. 3 is a similar circuit diagram showing the conditions existing during operation of the motor in the opposite direction;

Fig. 4 is a circuit diagram showing a modification of the arrangement in Figs. 1–3;

Fig. 5 is a circuit diagram of another specific embodiment of the invention;

Fig. 6 is an end elevational view of a rotation sensing switch means mounted at one end of the motor shaft and comprising a part of the instantly reversing arrangement of the present invention;

Fig. 7 is a vertical sectional view taken along the line 7—7 of Fig. 6; and

Fig. 8 is a fragmentary sectional view taken along the line 8—8 of Fig. 6.

Broadly speaking, my invention is applicable to a standard single phase split phase start motor with a centrifugal switch for cutting out the starting winding when the motor comes up to speed. A simple double throw manual switch element is used as a reversing control switch, and a pair of shunt circuits are provided around the centrifugal switch for instantly by-passing the centrifugal switch through one or the other of the shunt circuits upon operation of the control switch so that parallel circuit connection of the motor windings is obtained instantly without waiting for operation of the centrifugal switch. The invention utilizes a rotation responsive switch actuated by the motor shaft for disrupting the shunt circuit being used as soon as the motor reverses direction and at the same time establishing the other of the shunt circuits for completion and energization during the next subsequent movement of the control switch to its opposite position. As will be well understood, in a split phase start motor of this type each running winding is always connected across the supply line in the same sense.

Referring first to Figs. 1 to 3 of the drawings, one specific embodiment of the invention utilizes a double pole double throw manual switch 11 in which one of the poles 12 functions as a reversing control switch and coacts with a pair of contacts 13 and 14. A pair of primary windings 16 and 17, which are alike or substantially alike, are disposed in axially displaced relation in the usual manner, and a rotor 18 of the inductance squirrel cage type is disposed in operating relation adjacent the primary windings. One of the line terminals, indicated at 19, is connected directly to one end of both of the primary windings 16—17, and the other line terminal 21 is connected to the movable pole or switch blade 12 so that manual manipulation of the switch 11 causes the pole 12 to engage either of the contacts 13 or 14 for connecting either of the primary windings 16 or 17, respectively, directly across the line as the running winding of the motor for opposite directions of rotation. Obviously, the switch 11 may also be moved to a neutral position intermediate the contacts 13 and 14 for stopping the motor entirely so that the switch 11 serves as an energizing switch and as a reversing switch. For the sake of convenience, it will be assumed that when the pole 12 is in engagement with the contact 14 the motor is running in a clockwise direction with the winding 17 as the running winding, and when the pole 12 engages the contact 13 the motor is running in a counterclockwise direction with the primary winding 16 as the running winding.

For split phase starting purposes, a phase splitter comprising in this case a capacitor 22 is connected between the opposite ends of the primary windings 16 and 17 and is in series with a speed responsive or centrifugal switch 23. Obviously, when the switch 23 is open at running speed, the capacitor 22 and the remaining primary winding are out of circuit, but when the motor slows down below the threshold speed so that the centrifugal switch 23 closes, the primary windings 16 and 17 will then be connected in parallel circuit with the capacitor 22 in series with one of the primary windings so as to provide the desired negative torque for slowing down and reversing the direction of rotation of the motor. As the motor again attains running speed in the opposite direction, the centrifugal switch 23 eventually opens and cuts out one of the primary windings and the capacitor 22.

For effecting instant parallel circuit reversing connection of the primary windings 16 and 17 without waiting for the centrifugal switch 23 to close, I provide a pair of shunt circuits for temporarily by-passing the centrifugal switch 23. The shunt circuit arrangement includes a first set of fixed shunt contacts 24—26 and a second set of fixed shunt contacts 27—28 which are in this instance reversely interconnected as by wires 29 and 30. A connection is provided between the first set of shunt contacts 24—26 and one side of the centrifugal switch 23 by means of a lead 31 and a movable rotation sensing switch element 32, hereinafter described in detail, which moves between the contacts 24 and 26 in response to a change in direction of rotation of the motor shaft. The shunt circuit around the centrifugal switch is completed by means of a lead 33 connecting the opposite side of the centrifugal switch 23 to the remaining pole or switch blade 34 of the double throw switch 11 which engages one or the other of the second set of shunt contacts 27—28. Obviously, the shunt switch element 34 moves in unison with the control switch element 12 inasmuch as both the elements 34 and 12 are in this instance mechanically interlocked as a double pole double throw hand switch.

In Fig. 1, the circuit is shown with the various elements in their respective positions when the motor is running in a clockwise direction. Thus, the pole 12 of the main switch 11 is closed on the contact 14 so that the primary winding 17 is connected directly across the line terminals 19 and 21, the winding 17 thereby functioning as the running winding for the clockwise direction of operation of the motor. Inasmuch as the motor is at running speed, the centrifugal switch 23 is open so that the primary winding 16 and the capacitor 22 are disconnected from the line. Moreover, the rotation sensing switch element 32 and the shunt switch element 34 are in engagement with the contacts 26 and 28 respectively so that both of the shunt circuit paths around the centrifugal switch 23 are disrupted.

Assuming now that it is desired to reverse the direction of the motor to counterclockwise rotation, the control switch 11 is moved directly to its opposite position, as seen in Fig. 2, without the necessity of any delay or hesitation whatsoever. The instant the blade 12 of the switch 11 closes on the contact 13, it will be seen that the primary winding 16 is connected directly across the line terminals 19—21. At the same time, movement of the pole 34 of the switch 11 from the shunt contact 28 to the contact 27 completes a previously established shunt circuit path around the centrifugal switch 23 while the latter is still in the open position indicated in dotted lines in Fig. 2. Consequently, while the primary winding 16 is now connected directly across the line terminals, the previously used running winding 17 now becomes a starting winding and is connected across the line in parallel circuit with the winding 16 through capacitor 22, wire 31, rotation sensing switch 32, shunt contact 26, wire 29, shunt contact 27, shunt switch element 34, and wire 33. As thus connected, the motor has a substantially negative or reverse torque tending to slow it down. As the motor reduces speed, the centrifugal switch 23 eventually closes to the full line position of Fig. 2 so that temporarily there is an alternative parallel circuit connection of the winding 17 through the closed centrifugal switch 23 and the capacitor 22.

Referring next to Fig. 3, the motor eventually begins to rotate in a counterclockwise direction under the influence of the negative or reversing torque whereupon the rotation sensing switch element 32 immediately shifts from engagement with the shunt contact 26 to the shunt contact 24 thereby disrupting the previously established shunt circuit around the centrifugal switch 23. However, at this point the centrifugal switch 23 is still closed so that the reversing parallel circuit connection of the primary windings is maintained. As the motor gradually picks up speed in its counterclockwise direction of rotation, the centrifugal switch eventually opens to the dotted line position shown in Fig. 3 thereby cutting the primary winding 17 and the capacitor 22 out of the circuit and the motor continues to run single phase in the usual manner through the winding 16 as the running winding.

At the instant of reversal of direction of the motor, the movement of the rotation sensing switch 32 not only disrupts the previously used shunt circuit path through the interconnected shunt contacts 26—27 but establishes or partially sets up the opposite shunt circuit path through the interconnected contacts 24—28. This latter shunt path is adapted to be completed and energized upon the next subsequent reversal of the motor from counterclockwise to clockwise direction by throwing of the manual switch back to the position shown in Fig. 1. The foregoing steps are then repeated with the primary winding 17 functioning as the starting winding and the other winding 16 being immediately connected in parallel circuit through a shunt path comprising the wire 33, the shunt switch element 34, the shunt contact 28, the wire 30, the shunt contact 24, the rotation sensing switch element 32, the wire 31, and the capacitor 22. The remainder of the reversing operation from counterclockwise to clockwise direction will be evident from the preceding description.

In Fig. 4 I have illustrated a modification of the invention wherein a single pole double throw switch 36 is utilized as the control switch element instead of the double pole switch 11 shown in Figs. 1 to 3. This single pole switch 36 functions in the same manner as the pole 12 of the previously described switch and is adapted to engage either of the contacts 13 or 14 for connecting either of the primary windings 16 or 17 directly across the line terminals 19—21. In the same manner as previously described, the capacitor 22 and the centrifugal switch 23 are likewise connected in series between the primary windings 16 and 17. The shunt circuit arrangement in this case also includes a rotation sensing switch element 37 connected at one side of the centrifugal switch 23 and a two-position movable shunt switch or contact element 38 which is actuated by a current sensitive relay 39. As before, two sets of reversely interconnected shunt contacts 41—42 and 43—44 are arranged for coaction with the rotation sensing switch 37 and the shunt switch 38, respectively. The movable shunt contact 38 is connected to the opposite side of the centrifugal switch 23 by a wire 46 and the relay coil is likewise connected in series with the control switch contact 14. Consequently, when the main control switch 36 is closed on the contact 14 as shown in Fig. 4, the relay 39 is energized so that the shunt switch 38 closes on the shunt contact 44 at substantially the same time. Likewise when the control switch 36 is moved to its opposite position in engagement with the contact 13, the relay 39 is immediately deenergized and the shunt switch element 38 is spring biased so as to move almost instantly into engagement with the opposite shunt contact 43. Consequently, it will be seen that by utilization of the actuating relay 39, the shunt switch element 38 moves substantially in unison with the single pole control switch 36. It will be evident that the operation of the Fig. 4 circuit is otherwise identical with the operation hereinbefore described in connection with Figs. 1 to 3.

Fig. 5 illustrates a slightly different embodiment of the invention wherein the centrifugal switch is connected between the ends of the primary windings opposite to the ends between which the phase splitter or capacitor is connected. This is in contrast to the previously described arrangements wherein both the capacitor 22 and the centrifugal switch 23 are connected between the same ends of the primary windings. In order to achieve the same operating characteristics as heretofore described a slightly different arrangement of the double pole double throw manual switch and the shunt circuit contacts and rotation sensing switch element is necessary. However, for convenience the same reference numerals have been used in Fig. 5 for the primary windings 16 and 17, the rotor 18 the line terminals 19 and 21, the capacitor 22, and the centrifugal switch 23.

As illustrated, the capacitor 22 is connected between the ends of the primary windings 16 and 17 and a pair of wires 91 and 92 extend from these same ends of the windings 16 and 17 to a pair of fixed contacts 93 and 94, respectively. One pole, designated at 96, of the double pole double throw hand switch is connected to the line terminal 21 and is adapted to engage either of the contacts 93 or 94 for effecting reversal of the motor. The centrifugal switch 23 is connected between the opposite ends of the windings 16 and 17, as illustrated in Fig. 5, and a pair of wires 97 and 98 extend from these same opposite ends of the primary windings for interconnecting a pair of shunt contacts 99 and 101 and a second pair of fixed contacts 102 and 103 in parallel relation with the centrifugal switch 23. The rotation sensing switch element, designated at 104, coacts with the shunt contacts 99—101, and the remaining pole of the hand switch, designated at 106, is arranged for coaction between the contacts 102—103, the poles 96 and 106 of the hand switch being mechanically interlocked for unitary operation as indicated by the dot-and-dash line. Both the rotation sensing switch 104 and the pole 106 of the hand switch are connected to the line terminal 19 through a wire 107.

In the circuit condition shown in Fig. 5 the motor is shown running in a clockwise direction with the winding 17 being energized as the running winding through a circuit comprising line terminal 21, pole 96, contact 94, wire 92, winding 17, wire 98, contact 103, pole 106 (also shunt contact 101 and rotation sensing switch 104), wire 107, and line terminal 19. Since the motor is at running speed, the centrifugal switch 23 is open. Moreover, since the fixed contacts 93, 99, and 102 are each open, it will be seen that the winding 16 and the capacitor 22 are out of circuit. To reverse the direction of the motor, the hand switch is moved to its opposite position so that the pole 96 engages the contact 93 and the pole 106 engages the contact 102, as indicated in dotted lines. Immediately primary winding 16 is connected across the line terminals 19—21 through a path 21—96—93—91—16—97—102—106—107—19. At the same time, a shunt circuit path around the open centrifugal switch 23 is completed through 21—96—93—91—22—17—98—101—104—107—19. Thus, the previously used running winding 17 is now a starting winding and is connected along with the capacitor 22 in parallel circuit relation with the winding 16 so as to provide a strong negative torque which reduces the motor speed. Eventually, the centrifugal switch 23 closes to its dotted line position shown in Fig. 5 so that temporarily there is an alternative parallel circuit connection of the winding 17 and capacitor 22 through the centrifugal switch 23, wire 97, contact 102, pole 106, and wire 107. As the motor eventually begins to rotate in a counterclockwise direction the rotation sensing switch element 104 moves from shunt contact 101 to shunt contact 99, as shown in dotted lines in Fig. 5, thereby disrupting the previously completed shunt circuit around the centrifugal switch 23. However, at this time the centrifugal switch is still closed so that the reversing parallel circuit connection of the primary windings is maintained. As the motor comes up to speed in counterclockwise direction, the centrifugal switch 23 eventually opens thereby cutting the primary winding 17 and the capacitor 22 out of circuit and the motor continues to run single phase through the winding 16 as the running winding and with the switch elements 96, 104 and 106 in their dotted line positions shown in Fig. 5. From the foregoing description the subsequent operation of the circuit in changing from counterclockwise to clockwise operation will readily be understood.

As mentioned above, the Fig. 5 embodiment differs from the previously described embodiments in that the capacitor 22 and the centrifugal switch 23 are connected between the primary windings 16 and 17 at the respective opposite ends of the latter. However, from the foregoing description of the operation of the circuit, it will also be seen that the make-up of the running and reversing circuits also differs somewhat for the different embodiments of the invention. For example, in the embodiment of Figs. 1 to 3 the running circuit of the motor includes only the pole 12 of the hand switch 11, whereas the temporary shunt or starting circuit during reversal of the motor always includes the rotation sensing switch element 32 and the remaining pole 34 of the hand switch. However, in the Fig. 5 embodiment the running circuit always includes both poles 96 and 106 of the hand switch, and the reversing circuit includes the pole 96 of the hand switch and the rotation sensing switch element 104. With respect to the pole 106 of the hand switch in Fig. 5, it will be understood that instead of a mechanical interlock with the pole 96 for unitary operation, a current responsive relay arrangement can be substituted in the same manner as illustrated and heretofore described in connection with Fig. 4.

In Figs. 6 to 8 I have illustrated one mechanical arrangement for the rotation sensing switch element as designated at 32 in Figs. 1 to 3, at 37 in Fig. 4, and at 104 in Fig. 5. A housing 51 having a bottom wall 52, a side wall 53 and a top wall or cover 54 is rigidly secured to the end bell portion 56 of the motor by means of a pair of screws 57 extending through the bottom wall 52 of the housing into the motor hub. The end of the motor shaft, indicated at 58, projects from the end bell 56 into the housing 51 through an opening 59 in the bottom wall of the housing.

The rotation sensing switch consists of a pair of semi-circular friction shoes 61 having circumferential inner bearing portions 62 of reduced width in close fitting engagement with the periphery of the shaft 58. The shoes 61, which are preferably made of nylon or like material, are retained in assembled relation on the shaft 58 by means of a supporting spring member 63 formed from two lengths or bands of resilient spring metal. The resilient bands have straight end portions which are secured rigidly together, as at 64, for connecting the bands and the remaining portion of each band has a curvature conforming to the respective shoes 61. The curved portions of the bands, indicated at 66, are received in shallow circumferential grooves 67 provided at the outer periphery of the shoes 61 so that the shoes are resiliently held under predetermined spring pressure in frictional contact with the shaft 58. The shoes 61 each have a radially extending projection 68 which is received in a corresponding aperture in the curved portion 66 of the support spring 63 for locating the shoe on the spring and further holding the same in assembled relation. In addition, the shoes 61 are also provided with oppositely extending axial projections or abutments 69 which are adapted to engage either the bottom wall 52 or the cover 54 of the switch housing so as to limit any axial shifting of the shoe and spring assembly relative to the shaft 58.

At the outer end of the united straight portions 64 of the support spring, a pair of contact surfaces 71 are provided for coaction between a pair of fixed contact members, indicated generally at 72. The fixed contacts 72 are in the form of angular elements having leg portions 73 and 74, the leg portion 73 of each contact being secured to the outer end of one of a pair of integral bosses 75 extending from the bottom wall 52 of the switch housing 51 and the angularly extending leg portion 74 of the contact being disposed adjacent one of the contact surfaces 71. The portion 73 of each contact member 72 has a pilot hole or aperture 76 (Fig. 8) in which is received a locating post or pin 77 projecting from the corresponding boss 75. An electrical conductor or lead 78 extends from the motor through a passage 79 in the bottom wall 52 and the boss 75, and the uninsulated bare end of the conductor 78 has a soldered connection in an eyelet 81 which extends from the boss 75 through the leg portion 73 for securing the latter to the boss. Another lead or conductor 82 extends from the interior of the motor to a similar boss 83 within the switch housing 51 and has a similar eyelet connection with a crimped terminal 84 from which a flexible pigtail connection 86 extends to one of the curved sections 66 of the support spring 63.

Under the resilient pressure of the support spring 63, the shoes 61 are held against the shaft 58 with sufficient pressure to rotate with the shaft 58 to the extent permitted by the fixed contact members 72. As will be evident from Fig. 6, rotary movement of the spring is limited by engagement of the contact surfaces 71 with the oppositely disposed leg portions 74 of the contact members 72. As the motor shaft 58 reverses its direction of rotation the shoe and spring assembly 61—63 will rotate with the shaft 58 through a relatively slight distance until the corresponding contact surface 71 of the spring 63 engages the opposite contact member 72 whereupon further movement of the rotation sensing switch is prevented and the shaft 58 continues to rotate relative to the shoes 61. The connected ends 64 of the spring with the contact surfaces 71 corresponds to the rotation sensing switch element 32 or 37 in the previously described circuit diagrams. The fixed contacts 72 correspond to the shunt contacts 24—26 or 41—42 of the previously described arrangement. It will also be understood that the conductors 78 extend to the opposite set of shunt contacts 27—28 or 43—44 and that the conductor 82 is connected to one side of the centrifugal switch 23 in the manner described above. In either of the opposite positions of the rotation sensing switch, a shunt path is provided through one of the conductors 78, the corresponding contact member 72, the spring 63, the pigtail 86, the terminal 84, and the conductor 82.

From the foregoing, it will be seen that the present invention provides an extremely simple and inexpensive scheme for effecting instant reversing of a single phase motor. At the same time, the mechanical structure involved in the rotation sensing switch is of a highly durable construction so that the device can be used repeatedly for long periods of time without danger of mechanical failure.

Although the invention has been described in connection with certain specific embodiments thereof, it will be understood that various modifications and equivalents may be resorted to without departing from the scope of the invention as defined in the appended claims.

I claim:

1. In a split phase reversible motor, a pair of axially displaced primary windings, a double throw control switch for connecting either of said primary windings across a supply line as a running winding in a running circuit for running in forward or reverse directions, a phase splitter, a speed responsive switch arranged to connect the remaining winding and the phase splitter across the line in a starting circuit in parallel relation with the running winding when the speed responsive switch is closed, said speed responsive switch being adapted to open when the motor attains running speed for deenergizing said starting circuit, and means including a rotation sensing movable switch element for providing a shunt circuit around said speed responsive switch upon movement of said control switch between forward and reverse positions for effecting said parallel relation while said speed responsive switch is still open, said rotation sensing switch element being movable for subsequently deenergizing said shunt circuit in response to a change in running direction of the motor after said speed responsive switch has closed.

2. In a split phase reversible motor, a pair of axially displaced primary windings, a double throw control switch movable alternatively to forward or reverse positions for selectively connecting either of said windings across a supply line always in the same sense for running in forward or reverse directions, phase displacing means, a speed responsive switch arranged to connect the remaining winding and said phase displacing means across the line in parallel circuit relation with the running winding when the speed responsive switch is closed, said speed responsive switch being adapted to open when the motor attains running speed for cutting said remaining winding out of circuit and means for shunting said speed responsive switch including a pair of shunt contacts connected in parallel with said speed responsive switch and a rotation responsive switch element movable between said shunt contacts in response to a change in running direction of the motor for establishing reversing parallel connection of said windings in shunt relation around said speed responsive switch when the latter is open.

3. In a split phase reversible motor, a pair of axially displaced primary windings, a double throw control switch arranged to connect either of said primary windings across a supply line as a running winding for running in forward or reverse directions, a phase splitter, a speed responsive switch arranged to connect the remaining winding and the phase splitter across the line in parallel circuit relation with the running winding when the speed responsive switch is closed, said speed responsive switch being adapted to open when the motor attains running speed for deenergizing said remaining winding, and means providing a pair of shunt circuits around said speed responsive switch for effecting said parallel circuit relation in either running direction of the motor and in both open and closed positions of said speed responsive switch, said means including a two-position rotation sensing switch movable in response to a change in running direction of the motor for deenergizing one of said shunt circuits and partially establishing the other of said shunt circuits for use during the next subsequent reversal of the motor in the opposite direction.

4. In a split phase reversible motor, a pair of axially displaced primary windings, a single pole double throw control switch element for connecting either of said primary windings across a supply line as a running winding for running in forward or reverse directions, a phase splitter and a speed responsive switch connected between said primary windings for placing the remaining winding and the phase splitter across the line in parallel circuit with the running winding when the speed responsive switch is closed, said speed responsive switch being adapted to open when the motor attains running speed for deenergizing said remaining winding, means responsive to movement of said control switch element between forward and reverse positions for completing and energizing a shunt circuit around said speed responsive switch for effecting said parallel circuit while said speed responsive switch is still open, and a rotation sensing movable switch element in said shunt circuit for subsequently deenergizing said shunt circuit in response to a change in running direction of the motor after said speed responsive switch has closed.

5. In a split phase reversible motor, a pair of axially displaced primary windings, a single pole double throw control switch element for connecting either of said primary windings across a supply line as a running winding for running in forward or reverse directions, a phase splitter and a speed responsive switch connected between said primary windings for placing the remaining winding and the phase splitter across the line in parallel circuit with the running winding when the speed responsive switch is closed, said speed responsive switch being adapted to open when the motor attains running speed for deenergizing said remaining winding, a two-position rotation sensing switch element connected at one side of said speed responsive switch and operable in response to a change in running direction of the motor, a single pole double throw shunt switch element connected at the opposite side of said speed responsive switch and operable in response to movement of said control switch element between forward and reverse positions, and shunt circuit means including two pairs of interconnected shunt contacts cooperable with said rotation sensing switch element and said shunt switch element, respectively, whereby said rotation sensing switch element is operable to establish said parallel circuit in shunt relation around the speed responsive switch upon reversal of the motor in one direction and said shunt switch element is operable to complete and energize the previously established shunt circuit upon the next subsequent movement of said control switch element for reversing the motor in the opposite direction.

6. In a split phase reversible motor, a pair of axially displaced primary windings, phase displacing means connected in series with one of said windings, a double throw switch having a control pole movable alternatively to forward or reverse positions for selectively connecting either of said windings across a supply line as the running winding for running in forward or reverse directions, a speed responsive switch for connecting the remaining winding and said phase displacing means across the line in parallel circuit with the running winding when the speed responsive switch is closed, said speed responsive switch being adapted to open when the motor attains running speed for cutting said remaining winding out of circuit, means for shunting said speed responsive switch including two sets of interconnected shunt contacts, a rotation responsive switch connected at one side of said speed responsive switch and movable between one of said sets of shunt contacts in response to a change in running direction of the motor of establishing reversing parallel connection of said windings in shunt relation around said speed responsive switch, and a movable contact connected at the other side of said speed responsive switch and movable between the other of said sets of shunt contacts in response to movement of said pole between forward and reverse positions for completing and energizing said reversing parallel connection.

7. In a split phase reversible motor, a pair of axially displaced primary windings, a single pole double throw control switch element for connecting either of said primary windings across a supply line as a running winding for running in forward or reverse directions, a phase splitter and a speed responsive switch connected between said primary windings for placing the remaining winding and the phase splitter across the line in parallel circuit with the running winding when the speed responsive switch is closed, a first pair of spaced shunt contacts, a single pole double throw shunt switch element connected at one side of said speed responsive switch element and movable between said first pair of shunt contacts in response to movement of said control switch element between forward and reverse positions for completing and energizing a previously established shunt circuit around said speed responsive switch whereby to effect said parallel circuit connection of said primary windings instantly and while said speed responsive switch is still open, a second pair of spaced shunt contacts interconnected with said first pair of shunt contacts, and a single pole double throw rotation sensing switch element connected at the other side of said speed responsive switch and movable between said second pair of shunt contacts in response to a change in running direction of the motor for deenergizing the previously established shunt circuit after the speed responsive switch has closed and establishing a shunt circuit for the next subsequent reversal of the motor in the opposite direction, said speed responsive switch being adapted to open thereafter when the motor attains running speed for deenergizing said remaining winding.

8. In a split phase reversible motor, a pair of axially displaced primary windings, a single pole double throw control switch element arranged to connect either of said primary windings across a supply line as a running winding for running in forward or reverse directions, a phase splitter and a speed responsive switch connected between said primary windings for placing the remaining winding and the phase splitter across the line in parallel circuit with the running winding when the speed responsive switch is closed, said speed responsive switch being adapted to open when the motor attains running speed for deenergizing said remaining winding, means providing a pair of shunt circuits around said speed responsive switch for effecting parallel connection of said primary windings in either running direction of the motor and in both open and closed positions of said speed responsive switch, said means including a two-position shunt switch element movable in response to movement of the control switch for completing and energizing either one of said shunt circuits for reversal of the motor in either direction, and said means also including a two-position rotation sensing switch movable in response to a change in running direction of the motor for subsequently deenergizing said one shunt circuit and establishing the other of said shunt circuits for use during the next subsequent reversal of the motor in the opposite direction.

9. The combination of claim 4 further characterized by the provision of a double pole double throw control switch one pole of which comprises said control switch element and the other pole of which comprises said means.

10. The combination of claim 6 further characterized in that said double throw switch comprises a double pole switch including said control pole and said movable contact as the poles thereof.

11. In a split phase reversible motor, a pair of axially displaced primary windings, a double pole double throw control switch having one pole thereof arranged to connect either of said primary windings across a supply line as a running winding for running in forward or reverse directions, a phase splitter and a speed responsive switch connected between said primary windings for placing the remaining winding and the phase splitter across the line in parallel circuit with the running winding when the speed responsive switch is closed, said speed responsive switch being adapted to open when the motor attains running speed for deenergizing said remaining winding, means including two interconnected sets of spaced shunt contacts for providing alternative shunt circuits around said speed responsive switch for effecting parallel connection of said windings in either running direction of the motor and in both open and closed positions of said speed responsive switch, the other pole of said control switch being movable between one of said sets of shunt contacts for completing and energizing either one of said shunt circuits for reversal of the motor in either direction, and a single pole double throw rotation sensing switch movable between the other of said sets of shunt contacts in response to a change in running direction of the motor for subsequently deenergizing said one shunt circuit and establishing the other of said shunt circuits for use during the next subsequent reversal of the motor in the opposite direction.

12. The combination of claim 4 further characterized in that said means comprises relay means including a relay coil in circuit with said control switch element for energization and deenergization of the coil in response to movement of said control switch element between forward and reverse positions, a pair of fixed relay contacts in said shunt circuit and a movable relay contact cooperable between said fixed relay contacts in response to energization and deenergization of the relay coil.

13. The combination of claim 6 further characterized in that said double throw switch comprises a single pole double throw switch and said movable contact comprises the movable contact of a relay having a coil connected to said control switch for energization and deenergization of the coil in response to movement of the control switch between forward and reverse positions.

14. In a split phase reversible motor, a pair of axially displaced primary windings, a single pole double throw control switch arranged to connect either of said primary windings across a supply line as a running winding for running in forward or reverse directions, a phase splitter and a speed responsive switch connected between said primary windings for placing the remaining winding and the phase splitter across the line in parallel circuit with the running winding when the speed responsive switch is closed, said speed responsive switch being adapted to open when the motor attains running speed for deenergizing said remaining winding, means including two interconnected sets of spaced shunt contacts for providing alternative shunt circuits around said speed responsive switch for effecting parallel connection of said windings in either running direction of the motor and in both open and closed positions of said speed responsive switch, relay means including a relay contact movable between one of said sets of shunt contacts and a relay coil connected to said control switch for energizing and deenergizing the relay coil in response to movement of the control switch between forward and reverse positions whereby to complete and energize either one of said shunt circuits for reversal of the motor in either direction, and a single pole double throw rotation sensing switch movable between the other of said sets of shunt contacts in response to a change in running direction of the motor for subsequently deenergizing said one shunt circuit and establishing the other of said shunt circuits for use during the next subsequent reversal of the motor in the opposite direction.

15. In a split phase reversible motor, a pair of axially displaced primary windings, a double pole double throw control switch for connecting either of said primary windings across a supply line as a running winding for running in forward or reverse directions in a running circuit, a phase splitter, a speed responsive switch arranged to connect the remaining winding and the phase splitter across the line in a starting circuit in parallel relation with the running winding when the speed responsive switch is closed, said running circuit including both poles of said control switch and said starting circuit including only one of the poles of said control switch, said speed responsive switch being adapted to open when the motor attains running speed for deenergizing said starting circuit, and rotation sensing switch means connected in shunt relation across said speed responsive switch, said rotation sensing switch means being operable upon movement of said control switch between forward and reverse positions to provide a shunt circuit around said speed responsive switch for effecting said parallel relation while said speed responsive switch is open and being movable for subsequently deenergizing said shunt circuit in responsive to a change in running direction of the motor after said speed responsive switch has closed.

16. In a split phase reversible motor, a pair of axially displaced primary windings, a first double throw control switch element for connecting one side of a supply line to one end of either of said primary windings as a running winding for running in forward or reverse directions, a second double throw control switch element movable in response to movement of said first element between forward and reverse positions for connecting the other end of either of said windings to the other side of the line, a phase splitter connected to said one end of each of said windings, speed responsive switch means connected to said other end of each of said windings for placing the remaining winding and the phase splitter across the line in parallel circuit with the running winding when the speed responsive switch is closed, and means including a pair of spaced shunt contacts and a single pole double throw rotation sensing switch element connected in shunt relation across said speed responsive switch means for providing a shunt circuit around said speed responsive switch means whereby to effect said parallel circuit connection of said primary windings instantly and while said speed responsive switch is still open, said rotation sensing switch element being movable between said shunt contacts in response to a change in running direction of the motor for deenergizing a previously established shunt circuit after the speed responsive switch has closed and establishing a shunt circuit for the next subsequent reversal of the motor in the opposite direction, said speed responsive switch being adapted to open thereafter when the motor attains running speed for deenergizing said remaining winding.

17. The combination of claim 3 further characterized in that said means also includes a two-position shunt switch for completing either of said shunt circuits and relay means arranged to actuate said shunt switch in response to movement of said control switch.

18. The combination of claim 5 further characterized by the provision of relay means for moving said shunt switch element in response to movement of said control switch element.

No references cited.